(12) United States Patent
Fumanti

(10) Patent No.: US 7,535,806 B2
(45) Date of Patent: May 19, 2009

(54) APPARATUS AND METHOD FOR DETECTING LASER DROPOUT

(75) Inventor: Samuel Fumanti, Peckville, PA (US)

(73) Assignee: Cinram International Inc., Scarborough (CA)

( * ) Notice: Subject to any disclaimer, the term of this patent is extended or adjusted under 35 U.S.C. 154(b) by 652 days.

(21) Appl. No.: 11/176,774

(22) Filed: Jul. 7, 2005

(65) Prior Publication Data
US 2007/0008861 A1 Jan. 11, 2007

(51) Int. Cl.
*G11B 7/00* (2006.01)

(52) U.S. Cl. ............... 369/44.41; 369/116; 369/124.12

(58) Field of Classification Search ............... 369/120, 369/121, 122, 116, 47.5, 44.23, 44.24, 112.01, 369/47.51, 124.12, 44.41, 44.42, 124.1
See application file for complete search history.

(56) References Cited

U.S. PATENT DOCUMENTS

| | | | |
|---|---|---|---|
| 4,477,821 A | 10/1984 | Yamamoto et al. | |
| 4,783,774 A | 11/1988 | Enomoto | |
| 4,809,022 A | 2/1989 | Wilkinson et al. | |
| 4,835,758 A | 5/1989 | Fujishima | |
| 4,963,901 A | 10/1990 | Wilkinson et al. | |
| 4,982,397 A * | 1/1991 | Yokota | 369/53.24 |
| 5,297,129 A | 3/1994 | Wilkinson et al. | |
| 5,608,711 A | 3/1997 | Browne et al. | |
| 5,608,712 A | 3/1997 | Rilum et al. | |
| 5,798,992 A * | 8/1998 | Kaneko et al. | 369/53.26 |
| 6,259,666 B1 * | 7/2001 | Kobayashi et al. | 369/59.11 |
| 6,272,100 B1 * | 8/2001 | Toda et al. | 369/116 |
| 6,396,785 B1 * | 5/2002 | Kobayashi et al. | 369/53.26 |
| 6,469,969 B2 | 10/2002 | Carson et al. | |
| 6,814,897 B2 | 11/2004 | Morita | |
| 6,888,782 B2 | 5/2005 | Tateishi et al. | |
| 2003/0076761 A1 | 4/2003 | Abe et al. | |
| 2005/0025018 A1 | 2/2005 | Hsu et al. | |
| 2006/0023598 A1 | 2/2006 | Babinski et al. | |
| 2006/0101634 A1 | 5/2006 | Sweeney | |
| 2006/0104190 A1 | 5/2006 | Babinski | |
| 2006/0165419 A1 | 7/2006 | Musto | |
| 2006/0181706 A1 | 8/2006 | Sweeney | |
| 2006/0222808 A1 | 10/2006 | Pickutoski et al. | |
| 2006/0270080 A1 | 11/2006 | Rinaldi | |
| 2006/0274617 A1 | 12/2006 | Musto et al. | |

(Continued)

FOREIGN PATENT DOCUMENTS

WO WO94/23343 10/1994

OTHER PUBLICATIONS

U.S. Appl. No. 11/705,682 filed Feb. 13, 2007.

(Continued)

*Primary Examiner*—Nabil Z Hindi
(74) *Attorney, Agent, or Firm*—Cooper & Dunham, LLP

(57) ABSTRACT

Improvements to an optical recording apparatus comprising a laser light source are provided. The improvements include installing a photodiode in an optical path of at least a portion of the laser light beam from the laser light source, and connecting said photodiode to a detection circuit. The photodiode detects the laser light beam and generates a detection signal based on the detected beam. The detection circuit monitors the detection signal and generates an alarm signal if the detection signal indicates a dropout in the laser beam. The alarm signal can trigger an alarm indicator and/or cause a recording process to be halted.

25 Claims, 5 Drawing Sheets

U.S. PATENT DOCUMENTS

| | | | |
|---|---|---|---|
| 2007/0014224 A1 | 1/2007 | Sweeney |
| 2007/0029167 A1 | 2/2007 | Kelsch |
| 2007/0090006 A1 | 4/2007 | Kelsch |
| 2007/0098947 A1 | 5/2007 | Mueller |

OTHER PUBLICATIONS

U.S. Appl. No. 11/715,249 filed Mar. 6, 2007.
U.S. Appl. No. 11/726,968 filed Mar. 22, 2007.
"High Density Photoresist Mastering".
"A Guide To Stamper Making".
"Cutting LBRs down to Size", www.oto-online.com/nov00/cutting.html.
"Mastering Beyond DVD Densities".
"Ultra Violet—The Key to Successful DVD and CD Mastering".

\* cited by examiner

Prior Art

APPARATUS AND METHOD FOR DETECTING LASER DROPOUT

TECHNICAL FIELD

This application relates to optical recording. In particular, the application relates to improvements for detecting laser dropout in optical recording.

DESCRIPTION OF RELATED ART

Use of CDs (compact discs) and DVDs (digital versatile discs or digital video discs) as optical storage media ("optical disc") for storing and transporting content (such as audio, video, graphics, computer software, etc.) in an optically readable manner has been popular for a number of years. Several formats of optical discs are currently available, including (A) read-only formats such as CD-DA (digital audio compact disc), CD-ROM (CD-read-only memory), DVD-ROM, and other formats wherein content is prerecorded on the disc (such as by using an injection molding process), and (B) recordable formats in the form of (i) write-once read-many times formats such as CD-R (CD-recordable), and DVD±R (DVD-recordable), etc., or (ii) rewritable formats such as CD-RW (CD-rewriteable), DVD-RAM (DVD-Random Access Media), DVD–RW or DVD+RW (DVD-rewriteable), PD (Phase change Dual disk) and other phase change optical discs. Optical disc players for these optical discs use a red laser. Optical discs using a blue laser have also been introduced, such as HD DVD and BD (each of which includes read-only, recordable and rewritable formats). In addition, hybrid optical media which include a combination of formats are also available.

In conventional read-only type optical discs (for example, CD-ROM, DVD-ROM, etc.), data is generally stored as a series of "pits" embossed in a plane of "lands". Microscopic pits formed in a surface of a plastic medium [for example, polycarbonate or polymethyl methacrylate (PMMA)] are arranged in tracks, conventionally spaced radially from the center hub in a spiral track originating at the medium center hub and ending toward the medium's outer rim. The light reflected from a read-only medium's surface by an optical disc player or reader varies according to the presence or absence of pits along the information track. A photodetector and other electronics inside the optical disc player translate the signal from the transition points between these pits and lands caused by this variation into the 0s and 1s of the digital code representing the stored information.

Read-only type optical discs generally are produced by an injection molding process. Initially, data representing the content to be recorded, encoded as a run length limited digital code (commonly known as an EFM signal in CD manufacturing) which contains its digital information in the timing between transitions, is used to control a laser beam recorder to form pits in a photoresist or a dye-polymer layer on an optical grade glass disc known as a glass master in a mastering process. A metallized glass master is used in an electroforming process to form (typically, metal) stampers. A stamper is used on one side of an injection molding cavity to emboss an information layer of pits and lands on a transparent polymer substrate formed by injection molding. The information bearing surface of the substrate is then covered with a reflective film (of metal or alloy) or the like. In the case of a CD, a plastic protective coating is applied over the film, and then art (for example, a picture, a design, text, etc.) is typically printed on the upper surface of the disc, to form an end product. In the case of DVDs, two half-thickness substrates are typically formed, metallization is applied to one (for example, DVD-5) or both (for example, DVD-10, DVD-9, DVD-18) half-thickness substrates, and the two half-thickness substrates are bonded by an adhesive (for example, hotmelt adhesive, ultraviolet light-cured adhesive, etc.). A second information layer can be formed for a DVD (for example, DVD-18) by applying a photo-polymer coating over a metallization layer applied to a substrate and the second information layer is embossed by a stamper into the photo-polymer layer which is then UV cured, metallized and protective coated.

Recordable type optical media typically include a spiral wobble groove in the substrate. The groove defines recording channels on the disc for recording data, provides information for tracking of the disc while writing or reading data, and has its wobble frequency modulated to contain addressing and other information for the write and read processes. The substrate (including information layer bearing the spiral wobble groove) can be formed by injection molding, using a stamper electroformed with a glass master. In addition, recordable-type optical media generally include at least a recording layer, and in addition a reflective layer (of metal or alloy) and a protective layer. Information is recorded in the recordable-type optical medium by directing a laser light beam modulated by signals to selectively change optical characteristics (reflectivity or extinction coefficient) of the recording layer. The recording layer in write-once read-many times optical media typically includes a photosensitive organic dye which is heated during recording to irreversibly to form a pattern of marks or pits into the recording layer.

Each recording side of a rewritable disc also uses multiple layers beginning with a polycarbonate plastic substrate containing a shallow spiral groove extending from the inside to the outside diameter of the disc. A DVD-RW disc may additionally include pits and lands and a DVD-RAM disc also inside the groove itself. The substrates (including information layer bearing the spiral groove, land pre-pits and embossed areas) may be formed by injection molding, using a stamper electroformed with a glass master. Next in the multiple layers of a rewritable disc typically comes a dielectric layer, followed by a phase-change type recording layer having a polycrystalline structure, another dielectric layer and a reflective layer (of metal or alloy). Additional layers may also be incorporated above or below the dielectric layer, with a protective coating being applied as a last layer in single-sided optical media. During recording of the rewritable optical medium, the laser selectively heats tiny areas of the recording track to change the phase of each heated area from more crystalline into less crystalline (also known as "amorphous") phase, in order to create marks that can be called "pits" (the term "pit" is used broadly herein to cover, for example, a pit in a read-only type optical disc, and a pit or mark in a recordable or rewritable optical disc). During erase, the laser (in a process called "annealing") changes the amorphous areas back into more crystalline areas.

Various types of hybrid optical media are available. For example, one type of hybrid media has data pit patterns prerecorded on a surface of a substrate and has in addition a recording layer allowing a user to record data to the recording layer. Further, optical recording media having multiple recording layers are now also available. In addition, in another hybrid optical recording disc a read-only area and a recordable area are present on one side of the hybrid optical disc, with a wobble groove in the read-only area modulated by depressions in the substrate and extending into the substrate in the recordable area.

Accordingly, a laser source is used for pit formation for assorted types of optical discs. It is generally desired for the laser source to provide a laser beam having sufficiently consistent energy levels, and the beam is typically modulated by a modulator, according to the digital code encoding the data to be recorded (discussed above).

However, some laser sources occasionally experience dropouts. The term "dropout" as used herein refers to the undesirable occurrence in a laser beam in which the beam blinks (for example, fluctuated from an "ON" level to an "OFF" level and then back to an "ON" level). Laser dropouts can adversely affect pit formation in optical discs.

For example, laser dropouts may go through undetected in conventional apparatuses and processes for manufacturing read-only type optical discs. In conventional processes, discs are tested at the end of the process to cull out unreliable discs. In some instances, laser dropouts are so small that test equipment used to verify disc playability at the end of the manufacturing process may automatically correct for the missing data and play the program. When this happens, the person conducting the test has no way of knowing that there was a dropout. However, disc players purchased by consumers are not always able to make the same error correction, resulting in titles that do not play well in some players.

Conventional optical disc manufacturing processes and apparatuses do not include inexpensive, reliable means for monitoring the laser beam for dropouts during a mastering process.

A device which monitors a modulated beam, and then decodes the modulated beam and compares the decoded information to the actual data stream for any differences has been proposed. However, such a device is highly complex and expensive, and not necessarily reliable.

There is a need for a practical, inexpensive and reliable means for detecting dropouts during the mastering process, before discs are sold to consumers.

SUMMARY

This application describes improvements to an optical recording apparatus which adapt the apparatus to check for laser dropouts. Such an apparatus includes a laser light source. The improvement includes (1) a photodetector in an optical path of a light beam from the laser light source, and (2) a detection circuit. The photodetector detects the light beam and generates a detection signal based on the detected beam. The detection circuit monitors the detection signal and generates an alarm signal if the detection signal indicates a dropout in the laser beam.

The application also describes a method for adapting an optical recording apparatus to detect laser dropouts. The optical recording apparatus includes (A) a laser light source, (B) a mirror in an optical path of a laser light beam from the laser light source, and (C) a modulator for modulating a first light beam which reflects from the mirror. The method, according to an exemplary embodiment, comprises (a) installing a photodetector in an optical path of a light beam which is functionally related to the laser light beam which passes through the mirror, and (b) connecting the photodetector to a detection circuit. The photodetector detects the light beam and generates a detection signal based on the detected beam. The detection circuit monitors the detection signal from the photodetector and generates an alarm signal if the detection signal indicates a dropout in the laser beam.

The application also provides an apparatus which can detect laser dropout in a laser beam recorder configured for an optical recording format. In one embodiment, the apparatus includes a laser light source, a mirror, a modulator, a photodetector and a detection circuit. The mirror is in an optical path of a laser light beam from the laser light source. A portion of the laser light beam which is reflected by the mirror forms a first light beam. A portion of the laser light beam which passed through the mirror forms a second light beam. The photodetector is in an optical path of a second light beam, and the photodetector detects the second light beam and generates a detection signal based on the detected beam. The detection circuit monitors the detection signal and generates an alarm signal if the detection signal indicates a dropout in the laser beam.

In addition, this disclosure also provides a method for handling laser dropouts in an optical recording process. In one embodiment, the method includes (i) using a photodetector in an optical path of at least a portion of a laser light beam to convert the at least a portion of the laser light beam into a detection signal, (ii) using a detection circuit to monitor the detection signal and based on the monitoring detect a dropout in the laser light beam, and (iii) generating an alarm signal if the dropout is detected.

BRIEF DESCRIPTION OF THE DRAWINGS

The features of the present application can be more readily understood from the following detailed description with reference to the accompanying drawings wherein.

Similar reference numerals designate identical or corresponding parts throughout the several drawings.

DETAILED DESCRIPTION

This application describes an improved optical recording apparatus and a method for adapting an optical recording apparatus to detect laser dropouts. The apparatus may be integrated in an optical recording device for recording data on recordable or rewritable optical discs. Alternatively, the apparatus may be integrated in a laser beam recorder (LBR) apparatus used for cutting a glass master based on a formatted signal, and (if no laser dropout during the cutting process is detected) the glass master is used for manufacturing prerecorded optical discs. The improved laser beam recorder apparatus can be adapted to monitor a laser for dropouts during, for example, a photo resist mastering process, and interfaced with the control electronics to monitor the beam only when needed.

Any suitable laser may be used as the laser light source, depending on the optical disc format. However, a UV laser source which radiates laser light of a wavelength of 351 nm is preferred if the format is HD-DVD. HD-DVD and Blu-ray are two proposed formats which are competing to be the standard for the next generation optical recording disc. Each of HD-DVD and Blu-ray provides a pre-recorded format and a recordable format. Each format is designed for use with blue laser technology, in order to achieve higher data density, such as would be required for recording high definition video. Laser dropouts can affect recordation of data in any of the optical disc formats, regardless of whether a red laser, a blue laser or another suitable laser is used, and the techniques of this application can be utilized to detect the dropouts.

Modification of a conventional laser beam recorder apparatus will be discussed below as an exemplary embodiment of the techniques of this application. However, it should be understood to one skilled in the art that implementation of the techniques of this application is not limited to manufacturing of read-only optical discs, and that the techniques can be readily integrated in any optical disc recording process in which a laser light source is used.

Figure 1:
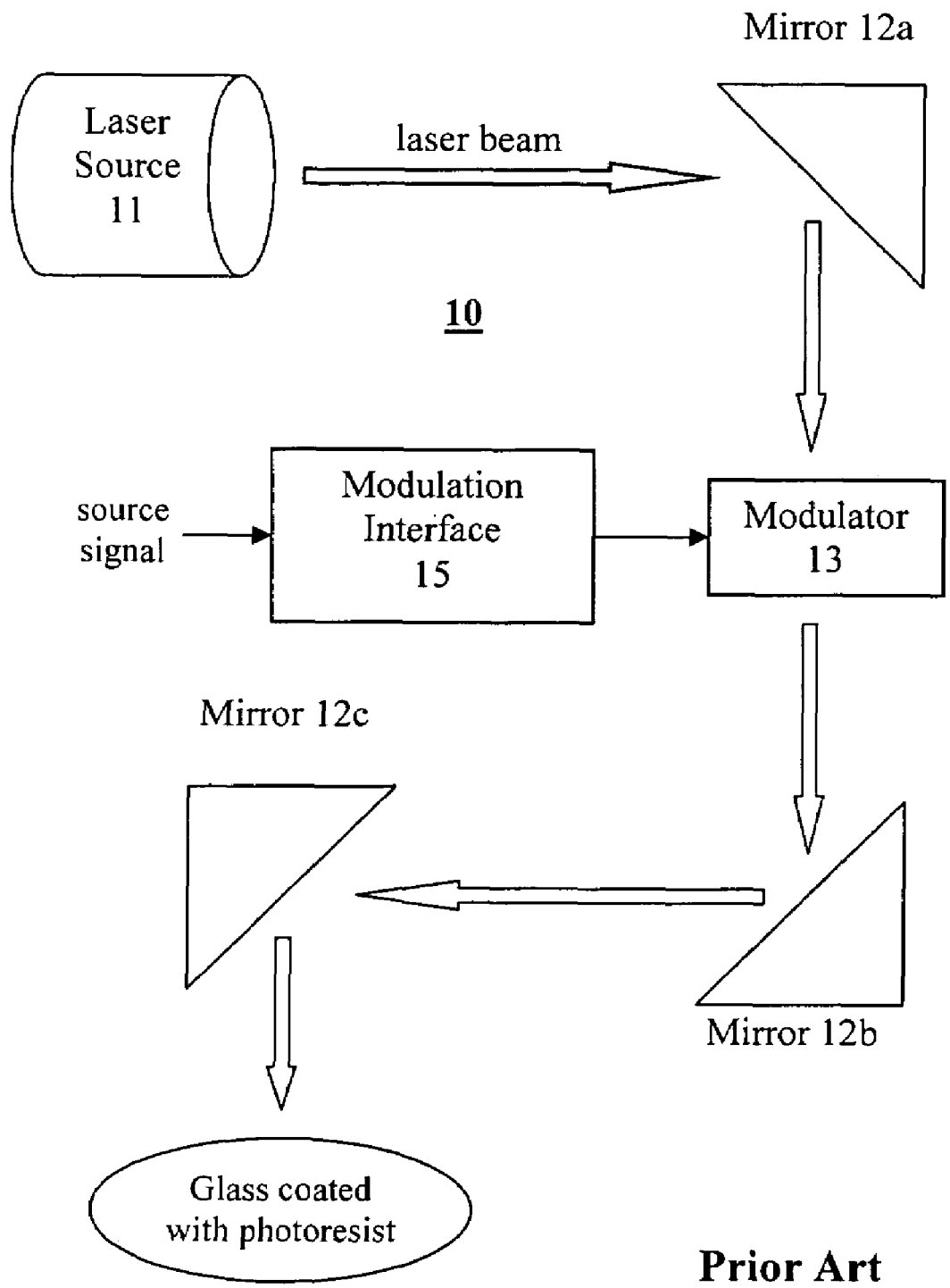
FIG. 1 shows a schematic diagram of a conventional apparatus for recording data on optical discs.

A conventional laser beam recorder apparatus which is configured for an optical recording format (for example, CD or DVD) is shown schematically in FIG. 1. Apparatus 10 includes a light source 11, a modulator (for example, acoustic-optical or electro-optical modulator) 13 and modulation interface 15. In addition, the apparatus 10 includes assorted optical components such as mirrors 12a-12c, etc.

The light source 11 generates a light beam for optical media mastering. The light beam is redirected via the mirror 12a to the modulator 13. The modulation interface 15 converts a source signal into a pulse-width formatted data signal which is supplied to the modulator 13. The modulator 13 modulates an intensity of the light beam according to the formatted data signal from the modulation interface 15. The modulated beam output by the modulator 13 switches amongst multiple intensity levels, including a high-level and a low-level.

The modulated beam is redirected via the mirrors 12b and 12c onto a rotating glass substrate coated with photoresist (or dye polymer), to form a pattern on the photoresist (or dye polymer) for forming a glass master (or, in the case of an optical disc recording device for recording onto recordable or rewritable optical discs, onto a recordable or rewritable optical disc, to form pits or marks in the recording layer).

As discussed above, some laser light sources sporadically experience dropouts.

The improvements disclosed by this patent specification involve supplementing the apparatus 10, in order to detect laser dropouts, as further discussed below. A relatively simple design can be implemented using relatively inexpensive parts to monitor the integrity of the laser beam when it is actually being used. This improvement can be used on any type of laser beam when it is necessary to know that the beam blinked (for example, fluctuated from an "ON" level to an "OFF" level and then back to an "ON" level).

Figure 2:
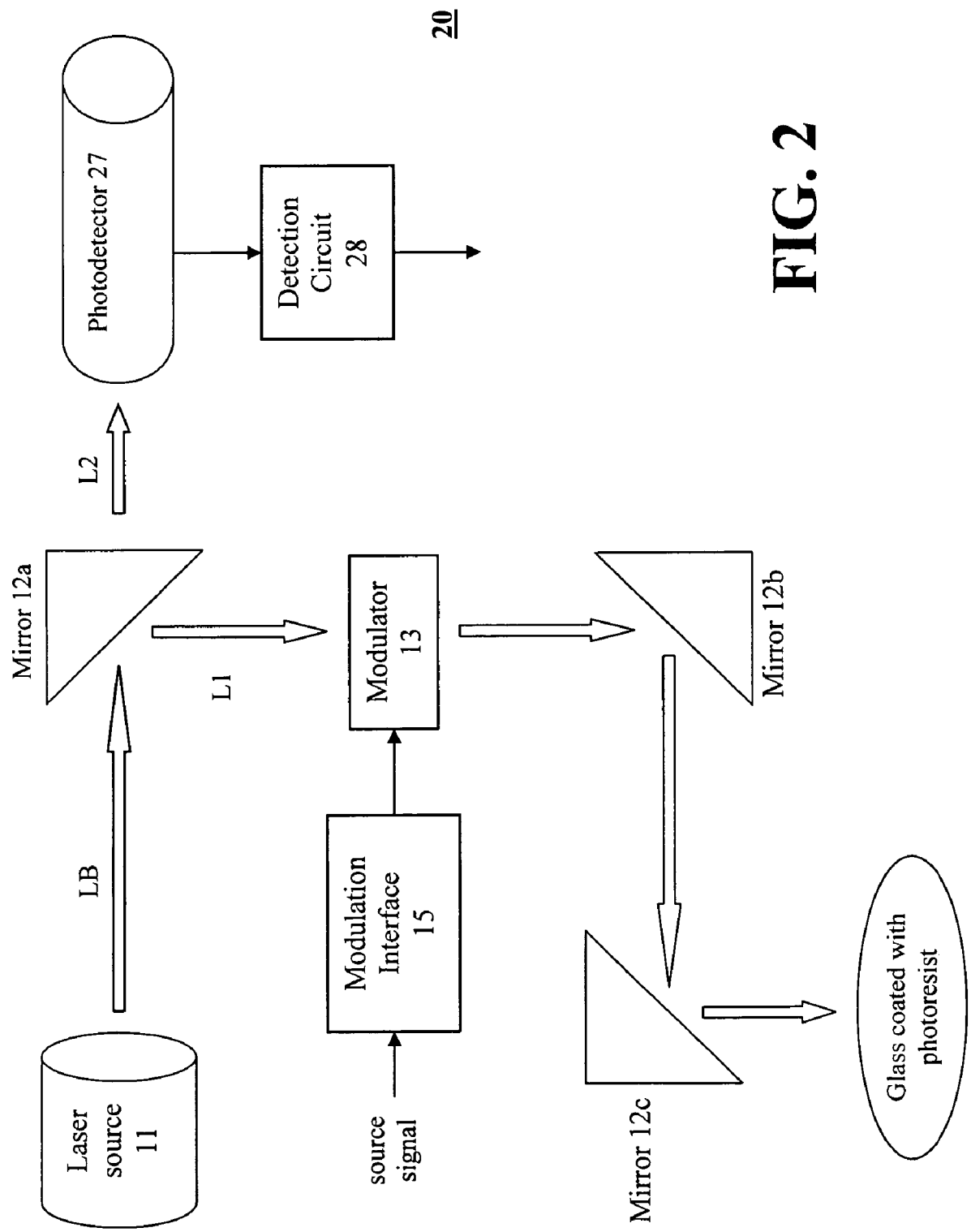
FIG. 2 shows a schematic diagram of an improved apparatus for recording data on optical discs, according to an exemplary embodiment of the present application.

An exemplary embodiment of such an improved apparatus is shown in FIG. 2. The differences between apparatus 20 shown in FIG. 2 and the apparatus 10 shown in FIG. 1 include a photodetector 27 and a detection circuit 28.

The photodetector 27 is preferably a photodiode, and can be inserted after the mirror 12a. While the larger part of the laser light beam LB is reflected by the mirror 12a towards the modulator 13, a small percentage of the laser light beam LB passes through the mirror 12a and is detected by the photodetector 27. The photodetector 27 is placed in an optical path of the (preferably, unmodulated) light beam L2 which passes through the mirror 12a. The photodetector 27 generates a detection signal based on the detected beam.

The detection circuit 28 is connected to the photodetector 27 and monitors the detection signal. The detection circuit generates an alarm signal if the detection signal indicates a dropout in the laser beam. The detection circuit may take on any of various configurations which can detect a variation in the detection signal indicating a laser dropout.

Figure 3:
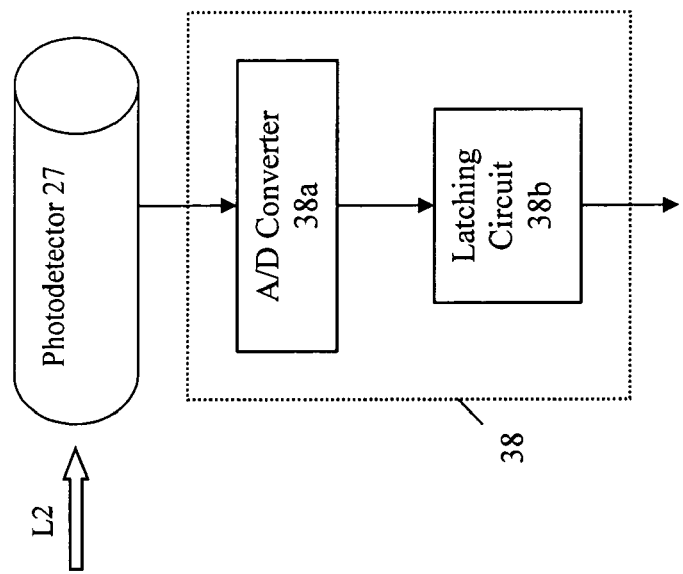
FIG. 3 shows a block diagram of a detection circuit, according to an exemplary embodiment.

In one exemplary embodiment (detection circuit 38 in FIG. 3), the photodetector may be connected to an analog-to-digital (A/D) converter 38a to digitize the detection signal into an "on" or "off" state, and a latching circuit 38b is coupled to the output of the A/D converter to receive the digitized detection signal. In another exemplary embodiment, the detection signal supplied by the photodetector device is a digitized signal, and the digitized detection signal from the photodetector device is supplied to the latching circuit. In either event, the latching circuit is configured to output the alarm signal when the beam blinks (for example, experiences a rapid ON to OFF to ON fluctuation).

Figure 4:
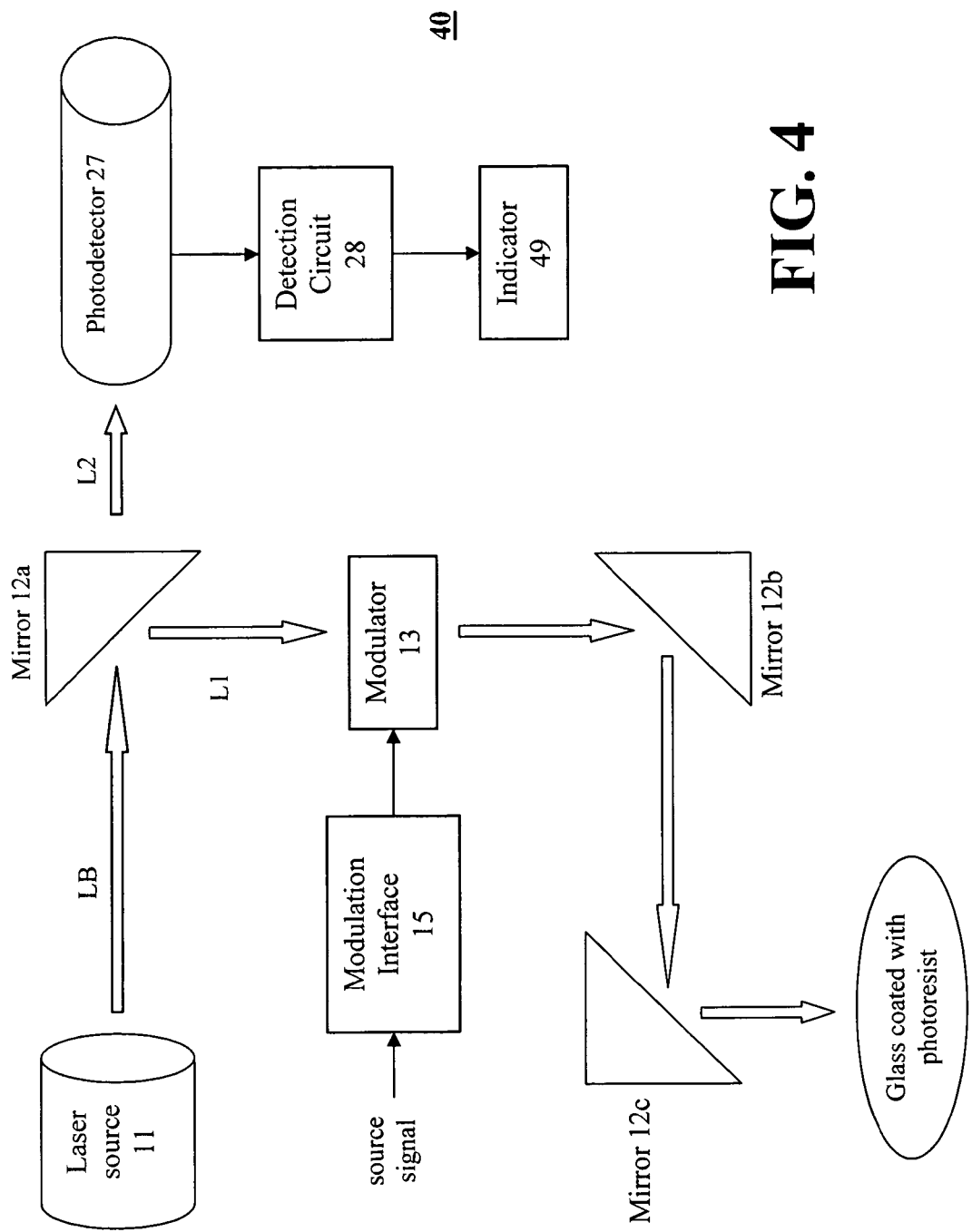
FIG. 4 shows a schematic diagram of an apparatus for recording data on optical discs, according to another exemplary embodiment.

According to another embodiment (FIG. 4), an improved apparatus 40 is similar to apparatus 20, and includes in addition an indicator 49 (for example, a LED, speaker, etc.). An audible or visual alarm may be triggered on the indicator 49 by the alarm signal, to inform the user that a laser dropout has been encountered. The alarm signal may be supplied to a control circuit, and the control circuit may halt a recording process of the optical recording apparatus when the alarm signal output by the detection circuit indicates that a laser dropout occurred. In addition, a reset may be provided with the indicator to allow it to be reset for the next run. In another embodiment, the alarm signal may be recorded or logged with appropriate annotation of time information and/or other information related to occurrence of the laser dropout in the recording process.

Figure 5:
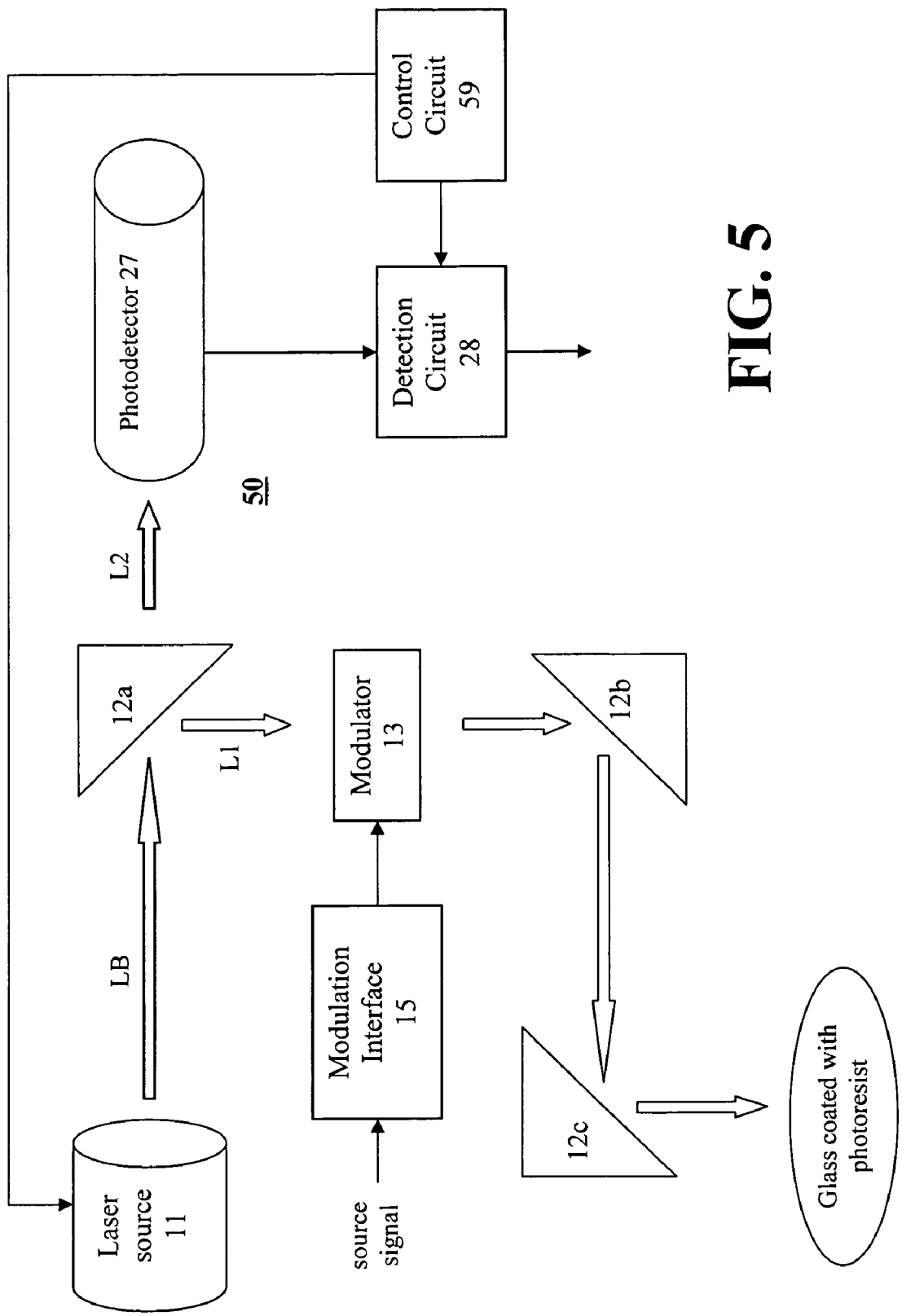
FIG. 5 shows a schematic diagram of an apparatus for recording data on optical discs, in accordance with yet another exemplary embodiment.

In another embodiment (FIG. 5), an improved apparatus 50 is similar to apparatus 20, and includes in addition a control circuit 59 (for example, LBR control electronics). The control circuit 59 enables the detection circuit 28 when a recording process of the optical recording apparatus commences, and disables the detection circuit when the recording process ends. The apparatus 50 may optionally include the detection circuit 38, and the latching circuit 38b can be interfaced with the control circuit 59 such that the latching circuit turns "on" during the actual recording (for example, glass master cutting) process and "off" after the process is completed. The turning "on" and "off" of the latching circuit can be performed by the control circuit or by the latching circuit itself while monitoring outputs of the control circuit.

The control circuit 59 may include a controller which causes a mechanical shutter of the laser light source to be opened when a recording process of the optical recording apparatus commences, and closed when the recording process ends. A time delay preferably follows after the shutter opens, before the controller causes the detection circuit to be enabled, and a time delay follows after the detection circuit is disabled, before the controller causes the shutter to be closed. For example, time delay circuitry may be added to allow time between opening of the mechanical shutter and commencement of actual monitoring.

Figure 6:
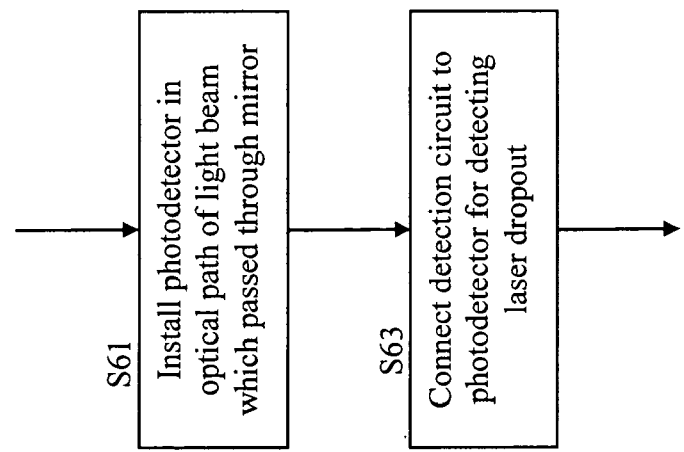
FIG. 6 shows a flow chart of a method, according to an exemplary embodiment, for adapting an apparatus for recording data on optical discs to enable the apparatus to detect laser dropouts.

A method for adapting an apparatus for recording data on optical discs to enable the apparatus to detect laser dropouts, according to an exemplary embodiment, will now be described with reference to FIGS. 1, 2 and 6. A method for adapting the optical recording apparatus 10 to detect laser dropouts includes installing photodiode 27 in an optical path of light beam L2 which passed through the mirror 12a (step S61) and connecting the photodiode 27 to detection circuit 28 configured to monitor a detection signal from the photodiode 27 and generate an alarm signal if the detection signal indicates a dropout in the laser beam (step S63). The method may additionally include connecting the detection circuit 28 to an alarm indicator (not shown) which is triggered by the alarm signal from the detection circuit.

The method may further comprise connecting the detection circuit 28 to a control circuit (not shown). The control circuit may be configured to halt a recording process of the optical recording apparatus when the alarm signal is output by the detection circuit 28. In another embodiment, the control circuit may be configured to enable the detection circuit 28 when a recording process of the optical recording apparatus commences, and disable the detection circuit 28 when the recording process ends.

The method may further include connecting a controller to a mechanical shutter of the laser light source, and the controller causes the shutter to be open when a recording process of the optical recording apparatus commences, and the controller causes the shutter to be closed when the recording process ends. The controller preferably allows a time delay after the controller causes the shutter to be open, before the controller causes the detection circuit to be enabled, and allows a time delay after the controller causes the detection circuit to be disabled, before the controller causes the shutter to be closed.

The adapted apparatus can be used, for example, in an optical recording device for recording a formatted signal onto a recordable or rewritable optical disc. Alternatively, the adapted apparatus can be integrated in a laser beam recorder for cutting a glass master, and the glass master is then used for manufacturing prerecorded optical discs in a format using multiple modulation levels.

Figure 7:
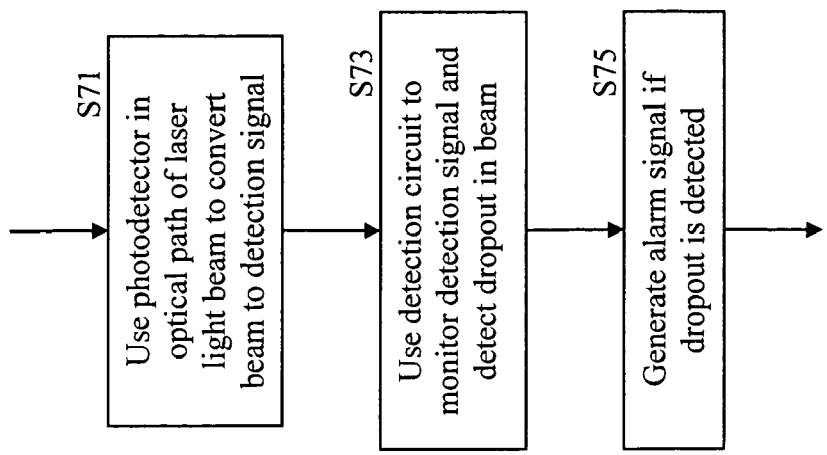
FIG. 7 shows a flow chart of a method for handling laser dropouts in an optical recording process, according to an exemplary embodiment.

A method for handling laser dropouts in an optical recording process, according to an exemplary embodiment, will now be described with reference to FIGS. 2 and 7.

The photodetector 27 in an optical path of light beam L2 is used to convert the light beam L2 into a detection signal (step S71). The detection circuit 28 is used to monitor the detection signal and based on the monitoring detect a dropout in the laser light beam LB (step S73). An alarm signal is generated if the dropout is detected (step S75).

The method may further comprise one or more of the following: (a) enabling the detection circuit when a recording process commences, and disabling the detection circuit when the recording process ends; (b) halting a recording process when the alarm signal is output; (c) converting the detection signal from the photodetector to a digital signal, and detecting a change in state of the digital signal, and when the change in state is detected, generating the alarm signal.

In describing exemplary embodiments, specific terminology is employed for the sake of clarity in this disclosure. However, the disclosure of this patent specification is not intended to be limited to the specific terminology so selected and it is to be understood that each specific element includes all technical equivalents that operate in a similar manner. In addition, the above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims. As another example, the steps in the methods described herein need not be performed in exactly the order described (for example, methods of FIG. 6 and FIG. 7).

What is claimed is:

1. An improvement to an optical recording apparatus comprising a laser light source and a modulator for modulating a first light beam from said laser light source, said improvement including:
   a photodetector in an optical path of a second light beam from said laser light source, said photodetector detecting said second light beam and generating a detection signal based on the detected beam; and
   a detection circuit configured to monitor said detection signal and generate an alarm signal if the detection signal indicates a dropout in the laser beam
   wherein said detection circuit includes an analog-to-digital converter and a latching circuit, said analog-to-digital converter converts the detection signal from the photodetector to a digital signal, and the latching circuit detects a change in state of the digital signal and generates said alarm signal when the change in state is detected.

2. The improved apparatus of claim 1, further comprising a control circuit interfaced with said latching circuit, wherein said latching circuit is enabled when a recording process of said optical recording apparatus commences, and disabled when the recording process ends.

3. The improved apparatus of claim 1, further comprising an alarm indicator which is triggered by said alarm signal from said detection circuit.

4. The improved apparatus of claim 1, wherein said photodetector includes a photodiode.

5. An improvement to an optical recording apparatus comprising a laser light source and a modulator for modulating a first light beam from said laser light source, said improvement including:
   a photodetector in an optical path of a second light beam from said laser light source, said photodetector detecting said second light beam and generating a detection signal based on the detected beam;
   a detection circuit configured to monitor said detection signal and generate an alarm signal if the detection signal indicates a dropout in the laser beam; and
   a controller, wherein said controller causes a mechanical shutter of the laser light source to be open when a recording process of said optical recording apparatus commences, and causes the shutter to be closed when the recording process ends.

6. The improved apparatus of claim 5, wherein a time delay follows after said controller causes said shutter to be open, before the controller causes said detection circuit to be enabled.

7. The improved apparatus of claim 5, wherein a time delay follows after said controller causes said detection circuit to be disabled, before the controller causes said shutter to be closed.

8. An improvement to an optical recording apparatus comprising a laser light source and a modulator for modulating a first light beam from said laser light source, said improvement including:
   a photodetector in an optical path of a second light beam from said laser light source, said photodetector detecting said second light beam and generating a detection signal based on the detected beam;
   a detection circuit configured to monitor said detection signal and generate an alarm signal if the detection signal indicates a dropout in the laser beam; and
   a control circuit, wherein said control circuit enables said detection circuit when a recording process of said optical recording apparatus commences, and the control circuit disables the detection circuit when the recording process ends.

9. The improved apparatus of claim 1, further comprising a control circuit, wherein said control circuit halts a recording process of said optical recording apparatus when said alarm signal is output by said detection circuit.

10. The improved apparatus of claim 1, wherein said second light beam is unmodulated.

11. The improved apparatus of claim 1, wherein said first light beam is a first portion of a laser beam output by said laser light source which was reflected by a mirror, and said second light beam is a second portion of the laser beam output by said laser light source which passed through the mirror.

12. A laser beam recorder comprising the improved apparatus of claim 1, wherein said laser beam recorder is used for cutting a glass master based on a formatted signal, and the glass master is then used for manufacturing prerecorded optical discs in the format using multiple modulation levels.

13. The improved apparatus of claim 1, wherein the apparatus is used for recording information on recordable optical discs.

14. The improved apparatus of claim 1, wherein the apparatus is used for recording information on rewritable optical discs.

15. The improved apparatus of claim 1, wherein the apparatus is used for recording information on hybrid optical discs.

16. A method for handling laser dropouts in an optical recording process, said method comprising the steps of:
  (a) using a photodetector in an optical path of at least a portion of a laser light beam to convert said at least a portion of the laser light beam into a detection signal;
  (b) using a detection circuit to monitor the detection signal and based on the monitoring detect a dropout in the laser light beam;
  (c) generating an alarm signal if said dropout is detected in step (b); and
  (d) enabling the detection circuit when a recording process commences; and disabling the detection circuit when the recording process ends.

17. The method of claim 16, further comprising: halting a recording process when said alarm signal is output.

18. The method of claim 16, further comprising: providing a mirror between said photodetector and a laser light source for generating said laser light beam, wherein a first portion of said laser light beam output by said laser light source is reflected by said mirror, and a second portion of the laser light beam is passed through the mirror to the photodetector.

19. The method of claim 16, further comprising: converting the detection signal from the photodetector to a digital signal; and detecting a change in state of the digital signal, and when the change in state is detected, generating the alarm signal.

20. A method for adapting an optical recording apparatus to detect laser dropouts, said optical recording apparatus including (i) a laser light source, (ii) a mirror in an optical path of a laser light beam from said laser light source, and (iii) a modulator for modulating a first light beam which reflects from said mirror, said method comprising:
  installing a photodiode in an optical path of a second light beam, wherein the second light beam is functionally related to said laser light beam which passes through said mirror, and said photodiode detects said second light beam and generates a detection signal based on the detected beam;
  connecting said photodiode to a detection circuit configured to monitor said detection signal from said photodiode and generate an alarm signal if the detection signal indicates a dropout in the laser beam; and
  connecting said detection circuit to a control circuit, wherein said control circuit enables said detection circuit when a recording process of said optical recording apparatus commences, and the control circuit disables the detection circuit when the recording process ends.

21. The method of claim 20, further comprising: connecting said detection circuit to a control circuit, wherein said control circuit halts a recording process of said optical recording apparatus when said alarm signal is output by said detection circuit.

22. A method for adapting an optical recording apparatus to detect laser dropouts, said optical recording apparatus including (i) a laser light source, (ii) a mirror in an optical path of a laser light beam from said laser light source, and (iii) a modulator for modulating a first light beam which reflects from said mirror, said method comprising:
  installing a photodiode in an optical path of a second light beam, wherein the second light beam is functionally related to said laser light beam which passes through said mirror, and said photodiode detects said second light beam and generates a detection signal based on the detected beam;
  connecting said photodiode to a detection circuit configured to monitor said detection signal from said photodiode and generate an alarm signal if the detection signal indicates a dropout in the laser beam; and
  connecting a controller to a mechanical shutter of the laser light source, wherein said controller causes said shutter to be open when a recording process of said optical recording apparatus commences, and the controller causes the shutter to be closed when the recording process ends.

23. The method of claim 22, wherein said controller allows a time delay after said controller causes said shutter to be open, before the controller causes said detection circuit to be enabled.

24. The method of claim 22, wherein said controller allows a time delay after said controller causes said detection circuit to be disabled, before the controller causes said shutter to be closed.

25. The method of claim 20, further comprising: connecting said detection circuit to an alarm indicator, wherein said alarm indicator is triggered by said alarm signal from said detection circuit.

* * * * *